United States Patent [19]

Uchida

[11] Patent Number: 5,554,919

[45] Date of Patent: Sep. 10, 1996

[54] CHARGE/DISCHARGE CIRCUIT HAVING A SIMPLE CIRCUIT FOR PROTECTING A SECONDARY CELL FROM OVERCHARGING AND OVERDISCHARGING

[75] Inventor: Takahito Uchida, Tokyo, Japan

[73] Assignee: NEC Corporation, Tokyo, Japan

[21] Appl. No.: 197,688

[22] Filed: Feb. 17, 1994

[30] Foreign Application Priority Data

Feb. 17, 1993 [JP] Japan ................................. 5-027064

[51] Int. Cl.⁶ .............................. H01M 10/44; H02J 7/00
[52] U.S. Cl. ................................. 320/14; 320/39; 320/5
[58] Field of Search ........................... 320/5, 9, 10, 11, 320/13, 14, 39; 361/92; 307/66

[56] References Cited

U.S. PATENT DOCUMENTS

| | | | |
|---|---|---|---|
| 5,073,837 | 12/1991 | Back | 361/92 |
| 5,155,428 | 10/1992 | Kang | 320/13 |
| 5,287,053 | 2/1994 | Hutchinson | 307/66 |
| 5,304,915 | 4/1994 | Sanpei et al. | 320/13 |

FOREIGN PATENT DOCUMENTS 1159550 11/1989 Japan.

*Primary Examiner*—Peter S. Wong
*Assistant Examiner*—Patrick B. Law

[57] ABSTRACT

A charge/discharge circuit includes a charge/discharge path consisting of only an N-channel MOS transistor connected between a first terminal to be connected to a secondary cell and a second terminal to be connected to an external DC voltage supply and a load. A first comparator is connected to the first terminal for detecting whether or not the secondary cell is in an overdischarged condition. A second comparator is also connected to the first terminal for detecting whether or not the secondary cell is in an overcharged condition. A third comparator is connected to the second terminal for detecting whether or not a voltage is supplied from the external DC voltage supply. A control logic circuit is connected to the first, second and third comparators so as to bring the MOS transistor into an OFF condition when no voltage is supplied from the external DC voltage supply and the secondary cell is in the overdischarged condition, or when the secondary cell is in the overcharged condition.

10 Claims, 2 Drawing Sheets

CHARGE/DISCHARGE CIRCUIT HAVING A SIMPLE CIRCUIT FOR PROTECTING A SECONDARY CELL FROM OVERCHARGING AND OVERDISCHARGING

BACKGROUND OF THE INVENTION

1. Field of the Invention

The present invention relates to a charge/discharge circuit, and more specifically to a charge/discharge circuit which is used in combination with a secondary cell and which is incorporated in a power supply circuit associated to electronic instruments and appliances.

2. Description of Related Art

Referring to FIG. 1, there is shown a basic structure of a typical conventional power supply circuit associated to electronic instruments and appliances, which is shown as the prior art in FIG. 4 of Japanese Utility Model Application Laid-Open Publication No. Heisei 1-159550.

The shown power supply circuit is composed of a combination of a DC power supply (AC-DC converter) 11 receiving an AC 100V and generating a DC voltage output, and a secondary cell (rechargeable battery) 2, so that a load 6 is driven by either the DC voltage generated from the DC power supply 11 or a DC output of the secondary cell 2.

More specifically, a positive terminal of the DC power supply 11 is connected to an output terminal 12A, and a negative terminal of the DC power supply 11 is connected to another output terminal 12B. A positive electrode of the secondary cell 2 is connected to the output terminal 12A through a parallel circuit consisting of a resistor R and a diode D, and a negative electrode of the secondary cell 2 is connected to the output terminal 12B. An anode of the diode D is connected to the positive electrode of the secondary cell 2, and a cathode of the diode D is connected to the output terminal 12A. The pair of output terminals 12A and 12B are connected to the load 6.

Now, assuming that the DC power supply 11 is a so-called AC adaptor, if the AC adaptor is connected to the terminals 12A and 12B, the secondary cell 2 is charged through the resistor R by the AC adaptor, and simultaneously, an electric power is supplied to the load 6 from the AC adaptor. After the voltage of the secondary cell 2 becomes the same as the output voltage of the AC adaptor (DC power supply 11), the DC electric power generated in the AC adaptor is supplied only to the load 6. If the AC adaptor is disconnected, an electric power is supplied from the secondary cell 2 through the diode D to the load 6.

As will be apparent from the above, only when the output voltage of the DC power supply 11 is higher than the voltage of the secondary cell 2, it is possible to charge the secondary cell. This charging is controlled on the basis of only a resistance value of the resistor R and the output voltage of the DC power supply 11. Therefore, a protection circuit is required which is capable of preventing an overcharging of the secondary cell. On the other hand, if the AC adaptor (DC power supply 11) is disconnected, the electric power is supplied from the secondary cell 2 to the load 6. However, since a discharge path of the secondary cell 2 is composed of only the diode D, even if the secondary cell becomes in an overdischarged condition, the electric power may often continue to be supplied from the secondary cell. Accordingly, a circuit for preventing the overdischarging is also required. Particularly, in the case that a lithium secondary cell is used, since performance of the lithium secondary cell is extremely deteriorated by the overcharging and the overdischarging, the protection circuit is indispensable.

SUMMARY OF THE INVENTION

Accordingly, it is an object of the present invention to provide a charge/discharge circuit for a secondary cell, which has a protection function for the overcharging and the overdischarging of the secondary cell.

Another object of the present invention is to provide a charge/discharge circuit having a simple protection circuit which can effectively prevent the overcharging and the overdischarging of the secondary cell.

The above and other objects of the present invention are achieved in accordance with the present invention by a charge/discharge circuit to be used in combination with a secondary cell, comprising:

a first terminal to be connected to a secondary cell;

a second terminal to be connected to an external DC voltage supply and a load;

a bidirectional analog switch connected between the first terminal and the second terminal;

a first detection means connected to the first terminal for generating a first detection signal indicative of whether or not the secondary cell connected to the first terminal is in an overdischarged condition;

a second detection means connected to the first terminal for generating a second detection signal indicative of whether or not the secondary cell connected to the first terminal is in an overcharged condition;

a third detection means connected to the second terminal for generating a third detection signal indicative of whether or not a voltage is supplied to the second terminal from the external DC voltage supply; and a control means receiving the first, second and third detection signals for controlling an ON/OFF condition of the analog switch so as to bring the analog switch into an OFF condition when no voltage is supplied to the second terminal from the external DC voltage supply and the secondary cell connected to the first terminal is in the overdischarged condition, or when the secondary cell connected to the first terminal is in the overcharged condition.

In a preferred embodiment, the first detection means compares a voltage on the first terminal with a first reference voltage and generates the first detection signal when the voltage on the first terminal is lower than the first reference voltage, and the second detection means compares the voltage on the first terminal with a second reference voltage which is higher than the first reference voltage, and generates the second detection signal when the voltage on the first terminal is higher than the second reference voltage. The third detection means compares the voltage on the second terminal with a third reference voltage which is higher than the Second reference voltage, and generates the third detection signal when the voltage on the second terminal is lower than the third reference voltage.

Specifically, the analog switch can be formed of an N-channel MOS transistor having a drain terminal connected to the first terminal and a source terminal connected to the second terminal. The first detection means can be constituted of a first comparator having its non-inverted input connected to the first terminal and its inverted input connected to the first reference voltage, so that the first comparator generates an inactive first detection signal when the voltage on the first terminal is lower than the first reference voltage. The second detection means can be constituted of a second comparator having its inverted input connected to the first terminal and its non-inverted input connected to the second reference voltage, so that the second comparator generates an inactive second detection signal when the voltage on the first terminal is higher than the second reference voltage. The third detection means can be constituted of a third comparator having its non-inverted input connected to the second terminal and its inverted input connected to the third reference voltage, so that the third comparator generates an inactive third detection signal when the voltage on the second terminal is lower than the third reference voltage. In this case, the control means outputs a low level signal to a gate of the MOS transistor so as to put the MOS transistor into an OFF condition when the control means receives the inactive third detection signal and the inactive first detection signal or when the control means receives the inactive second detection signal.

For example, the control means can include an OR gate having a first input connected to an output of the first comparator and a second input connected to an output of the third comparator, and an AND gate having a first input connected to an output of the second comparator and a second input connected to an output of the OR gate, an output of the AND gate being connected to the gate of the MOS transistor. Alternatively, the control means can further include a second AND gate having a first input connected to the output of the second comparator and a second input connected to receive an external control signal, an output of the second AND gate being connected to the first input of the first named AND gate.

The above and other objects, features and advantages of the present invention will be apparent from the following description of preferred embodiments of the invention with reference to the accompanying drawings.

DESCRIPTION OF THE PREFERRED EMBODIMENTS

Figure 1:
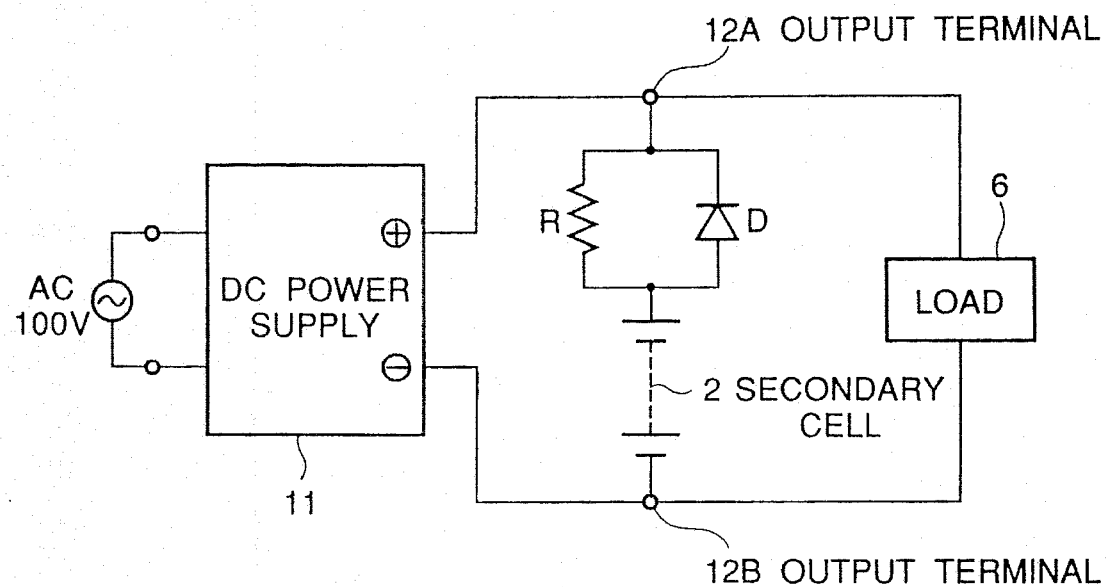
FIG. 1 is a circuit diagram of an electric power supply circuit including a conventional charge/discharge circuit.
Figure 2:
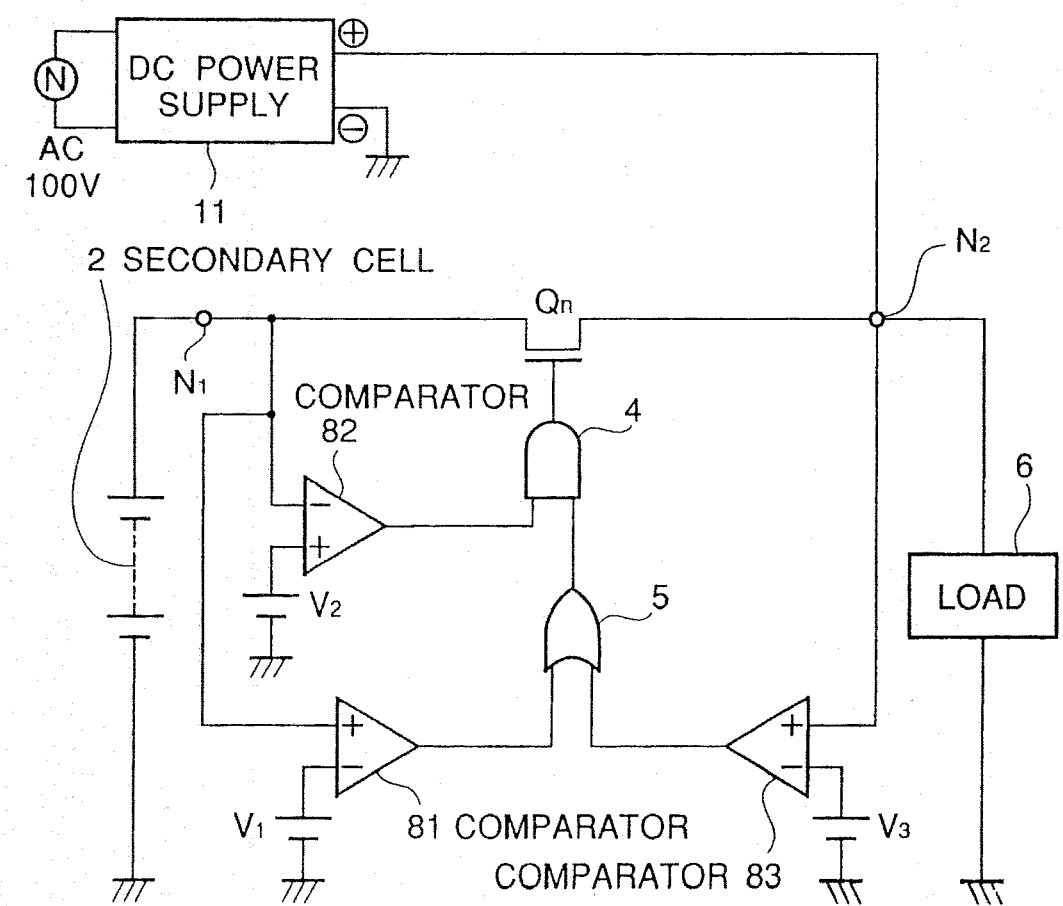
FIG. 2 is a circuit diagram of a first embodiment of the charge/discharge circuit in accordance with the present invention.

Referring to FIG. 2, there is shown a circuit diagram of a first embodiment of the charge/discharge circuit in accordance with the present invention. In FIG. 2, elements similar to those shown in FIG. 1 are given the same Reference Numerals.

The shown charge/discharge circuit in accordance with the present invention includes an N-channel MOS transistor Qn having its drain terminal connected at a node N1 to the positive electrode of the secondary cell 2, the negative electrode of which is in turn connected to the ground. A source terminal of the MOS transistor Qn is connected at a node N2 to one end of the load 6 and the positive output terminal of the DC power supply (AC adaptor) 11. The other terminal of the load 6 and the negative output terminal of the DC power supply 11 are connected to the ground.

A first comparator 81, which functions as an overdischarge detecting comparator, has its non-inverted input connected at the node $N_1$ to the positive electrode of the secondary cell 2 and its inverted input connected to a first reference voltage (constant voltage) $V_1$, which corresponds to a threshold for discriminating an overdischarge of the secondary cell. A second comparator 82, which functions as an overcharge detecting comparator, has its inverted input connected at the node $N_1$ to the positive electrode of the secondary cell 2 and its non-inverted input connected to a second reference voltage (constant voltage) $V_2$, which corresponds to a threshold for discriminating an overcharge of the secondary cell. A third comparator 83, which functions to detect a voltage supplied from the AC adaptor 11, has its non-inverted input connected at the node N2 to the source terminal of the MOS transistor Qn and its inverted input connected to a third reference voltage (constant voltage) $V_3$, which makes it possible to discriminate the supplying of the voltage from the external DC voltage supply and which is sufficiently high not to disturb the detection of the overcharging and the overdischarging.

Therefore, the first, second and third reference voltages $V_1$, $V_2$ and $V_3$ have the following relation: $V_1 < V_2 < V_3$.

An output of each of the first comparator 81 and the third comparator 83 is connected to a two-input OR gate 5, which in turn has an output connected to one input of a two-input AND gate 4. The other input of the two-input AND gate 4 is connected to receive an output of the second comparator 82, and an output of the two-input AND gate 4 is connected to a gate of the N-channel MOS transistor Qn.

Figure 3:
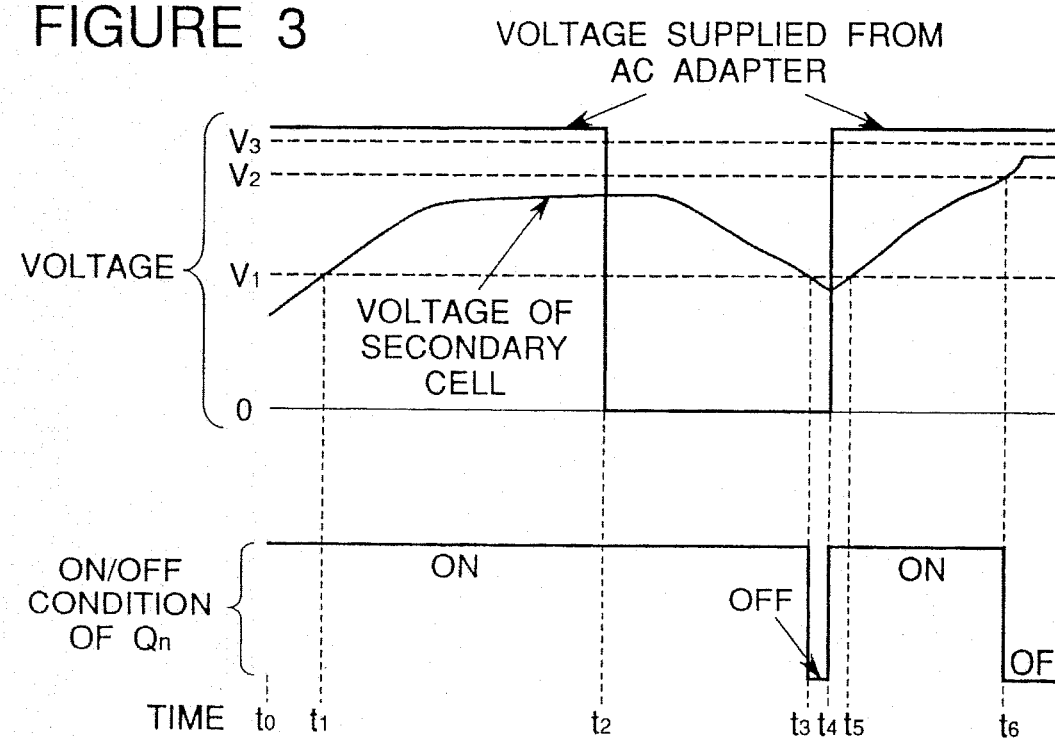
FIG. 3 is a timing chart illustrating an operation of the charge/discharge circuit shown in FIG. 2.

Referring to FIG. 3, there is shown a timing chart illustrating an operation of the charge/discharge circuit shown in FIG. 2. During a period from the time $t_0$ to the time $t_1$, the secondary cell 2 is in the overdischarged condition, and the electric power is supplied from the AC adaptor 11. In this condition, since the voltage of the secondary cell 2 is lower than each of $V_1$ and $V_2$, and since the voltage supplied from the AC adaptor 11 is higher than $V_3$, the output of the first comparator 81 is brought to a low level, and the output of the second comparator 82 is brought to a high level, and also, the output of the third comparator 83 is brought to the high level. Therefore, the MOS transistor Qn is turned on, so that the AC adaptor 11 supplies the electric power to the load 6 while charging the secondary cell 2.

During a period from the time $t_1$ to the time 12, the MOS transistor Qn is also maintained in the ON condition, since the voltage of the secondary cell 2 is still lower than $V_2$, and therefore, since the output of the second comparator 82 is maintained at the high level.

Here, it is assumed that, during a period from the time $t_2$ to the time $t_4$, the AC adaptor 11 is disconnected from the node $N_2$, namely, from the source terminal of the MOS transistor Qn, so that no electric power is supplied from the AC adaptor 11. Therefore, the output of the third comparator 83 is brought to and maintained at the low level. However, during a period from the time $t_2$ to the time $t_3$, since the secondary cell 2 is in an operating voltage range, namely, since the voltage of the secondary cell 2 is lower than $V_2$ but high than $V_1$, the output of each of the comparators 81 and 82 is at the high level, and therefore, the MOS transistor Qn is still maintained in the ON condition, so that the electric power is supplied from the secondary cell 2 to the load 60.

During a period from the time $t_3$ to the time $t_4$, the voltage of the secondary cell 2 becomes lower than $V_1$, namely, the secondary cell 2 is put in the overdischarged condition. In this condition, since the output of the comparator 81 is brought to the low level, the MOS transistor Qn is turned off, so that the electric power is not supplied from the secondary cell 2 to the load 6. Accordingly, no electric power is supplied to the load 6.

At the time $t_4$, the AC adaptor 11 is connected to the node $N_2$, namely, to the source terminal of the MOS transistor Qn, again, so that the electric power is supplied from the AC adaptor 11. Accordingly, since the output of the third comparator 83 is brought to the high level, the MOS transistor Qn is turned on again, so that the secondary cell 2 is charged, again. During a period from the time $t_4$ to the time $t_6$, the MOS transistor Qn is maintained in the ON condition so that the secondary cell 2 continues to be charged from the AC adaptor 11, and simultaneously, the electric power is supplied to the load 6 from the AC adaptor 11.

At the time $t_6$, the voltage of the secondary cell 2 becomes higher than the $V_2$, and therefore, the output Of the comparator 82 is brought to the low level, so that the MOS transistor Qn is turned off. Namely, a further charging is inhibited.

Figure 4:
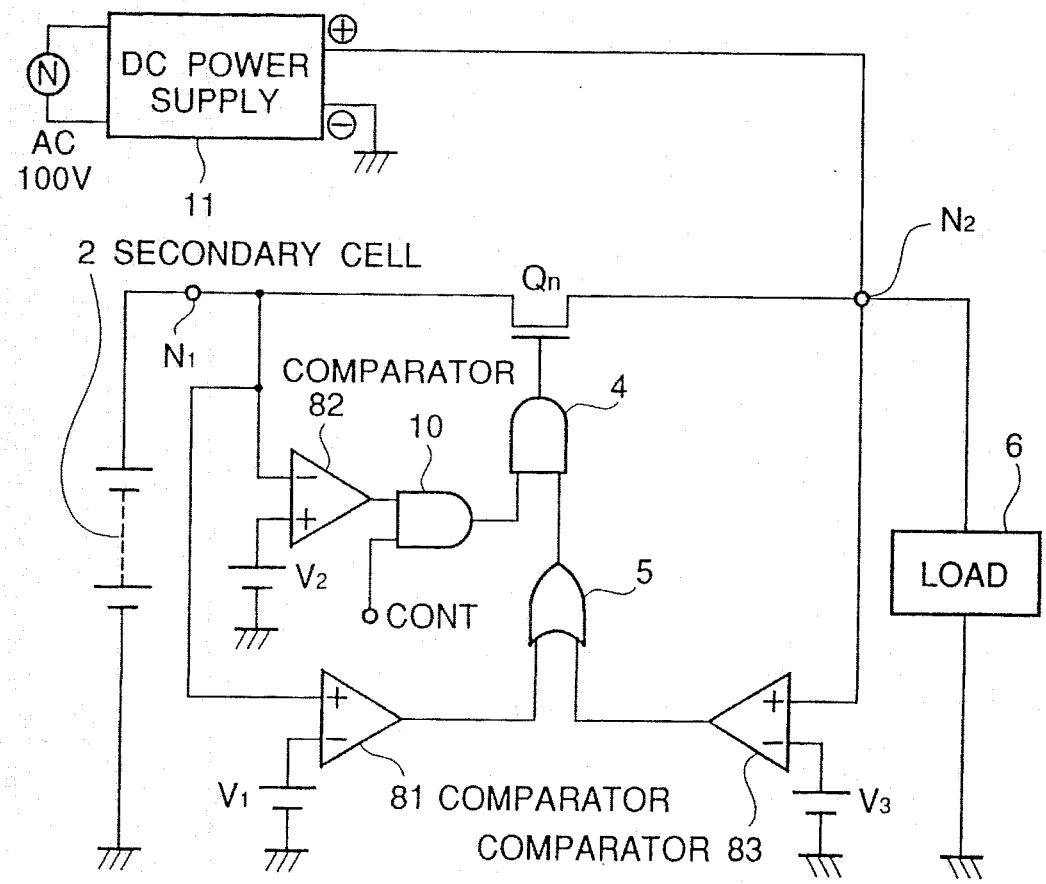
FIG. 4 is a circuit diagram of a second embodiment of the charge/discharge circuit in accordance with the present invention.

Referring to FIG. 4, there is shown a diagram of a circuit diagram of a second embodiment of the charge/discharge circuit in accordance with the present invention. In FIG. 4, elements similar to those shown in FIG. 2 are given the same Reference Numerals, and explanation thereof will be omitted for simplification of the description.

As will be noted from comparison between FIGS. 2 and 4, the second embodiment is different from the first embodiment only in that the second embodiment additionally includes a second two-input AND gate 10 having its one input connected to the output of the second comparator 82 and an output connected to the other input of the first AND gate 4. The other input of the second AND gate 10 is connected to receive an external control signal CONT, which is normally maintained at a high level. Therefore, if the external control signal CONT is forcibly brought to the low level, it is possible to inhibit the supplying of the electric power from the secondary cell 2 to the load 6.

As will be apparent from the above, the charge/discharge circuit in accordance with the present invention is characterized in that it comprises the circuit for discriminating whether or not the electric power is supplied from the DC power supply, the circuits for monitoring the overcharging and overdischarging of the secondary cell, and the analog switch controlled by these circuits. With this arrangement, it is possible to effectively prevent the overcharging and overdischarging of the secondary cell, and therefore, to lengthen the lifetime of the secondary cell. In addition, since the analog switch is composed of a bidirectional MOS transistor, the charge/discharge path which would be otherwise constituted of two individual switches used for the charging and the discharging in the prior art, respectively, can be formed of only one common switch, and therefore, when the circuit is implemented in an integrated circuit, it is effective in reducing a chip size.

The invention has thus been shown and described with reference to the specific embodiments. However, it should be noted that the present invention is in no way limited to the details of the illustrated structures but changes and modifications may be made within the scope of the appended claims.

I claim:

1. A charge/discharge circuit for preventing overcharging and overdischarging of a secondary cell, the circuit comprising:

a first terminal connected to the secondary cell;

a second terminal connected to an external DC voltage supply and a load;

a bidirectional analog switch connected between said first terminal and said second terminal;

a first detection means connected to said first terminal for generating a first detection signal when a voltage on said first terminal is lower than a first reference voltage;

a second detection means connected to said first terminal for generating a second detection signal when the voltage on said first terminal is higher than a second reference voltage which is higher than said first reference voltage;

a third detection means connected to said second terminal for generating a third detection signal when a voltage on said second terminal is lower than a third reference voltage which is higher than said second reference voltage; and a control means receiving said first, second and third detection signals for controlling an ON/OFF condition of said analog switch so as to bring said analog switch into an OFF condition when the voltage on said second terminal is lower than said third reference voltage and the voltage on said first terminal is lower than said first reference voltage, or when the voltage on said first terminal is higher than said second reference voltage.

2. A charge/discharge circuit claimed in claim 1 wherein said analog switch is formed of a MOS transistor having a drain terminal connected to said first terminal and a source terminal connected to said second terminal, wherein said first detection means is constituted of a first comparator having its non-inverted input connected to said first terminal and its inverted input connected to said first reference voltage, said first comparator generating an inactive first detection signal when the voltage on said first terminal is lower than said first reference voltage.

wherein said second detection means is constituted of a second comparator having its inverted input connected to said first terminal and its non-inverted input connected to said second reference voltage, said second comparator generating an inactive second detection signal when the voltage on said first terminal is higher than said second reference voltage;

wherein said third detection means is constituted of a third comparator having its non-inverted input connected to said second terminal and its inverted input connected to said third reference voltage, said third comparator generating an inactive third detection signal when the voltage on said second terminal is lower than said third reference voltage; and wherein said control means outputs a low level signal to a gate of said MOS transistor so as to put said MOS transistor into an OFF condition when said control means receives said inactive third detection signal and said inactive first detection signal or when said control means receives said inactive second detection signal.

3. A charge/discharge circuit claimed in claim 2 wherein said control means includes an OR gate having a first input connected to an output of said first comparator and a second input connected to an output of said third comparator, and an AND gate having a first input connected to an output of said second comparator and a second input connected to an output of said OR gate, an output of said AND gate being connected to said gate of said MOS transistor.

4. A charge/discharge circuit claimed in claim 3 wherein said control means further includes a second AND gate having a first input connected to the output of said second comparator and a second input connected to receive an external control signal, an output of said second AND gate being connected to said first input of said first named AND gate.

5. A charge/discharge circuit for preventing overcharging and overdischarging of a secondary cell, comprising:

a first terminal connected to the secondary cell;

a second terminal connected to an external DC voltage supply and a load;

a bidirectional analog switch connected between said first terminal and said second terminal;

a first detection means connected to said first terminal for generating a first detection signal indicative of whether or not said secondary cell connected to said first terminal is in an overdischarged condition;

a second detection means connected to said first terminal for generating a second detection signal indicative of whether or not said secondary cell connected to said first terminal is in an overcharged condition;

a third detection means connected to said second terminal for generating a third detection signal indicative of whether or not a voltage is supplied to said second terminal from said external DC voltage supply; and a control means receiving said first, second and third detection signals for controlling an ON/OFF condition of said analog switch so as to bring said analog switch into an OFF condition when no voltage is supplied to said second terminal from said external DC voltage supply and said secondary cell connected to said first terminal is in the overdischarged condition, or when said secondary cell connected to said first terminal is in the overcharged condition.

6. A charge/discharge circuit claimed in claim 5, wherein said first detection means compares a voltage on said first terminal with a first reference voltage and generates said first detection signal when the voltage on said first terminal is lower than said first reference voltage;

wherein said second detection means compares the voltage on said first terminal with a second reference voltage which is higher than said first reference voltage, said second detection means generating said second detection signal when the voltage on said first terminal is higher than said second reference voltage, and wherein said third detection means compares the voltage on said second terminal with a third reference voltage which is higher than said second reference voltage, said third detection means generating said third detection signal when the voltage on said second terminal is lower than said third reference voltage.

7. A charge/discharge circuit claimed in claim 6 wherein said analog switch is formed of an N-channel MOS transistor having a drain terminal connected to said first terminal and a source terminal connected to said second terminal, wherein said first detection means is constituted of a first comparator having its non-inverted input connected to said first terminal and its inverted input connected to said first reference voltage, said first comparator generating an inactive first detection signal when the voltage on said first terminal is lower than said first reference voltage;

wherein said second detection means is constituted of a second comparator having its inverted input connected to said first terminal and its non-inverted input connected to said second reference voltage, said second comparator generating an inactive second detection signal when the voltage on said first terminal is higher than said second reference voltage;

wherein said third detection means is constituted of a third comparator having its non-inverted input connected to said second terminal and its inverted input connected to said third reference voltage, said third comparator generating an inactive third detection signal when the voltage on said second terminal is lower than said third reference voltage; and wherein said control means outputs a low level signal to a gate of said MOS transistor so as to put said MOS transistor into an OFF condition when said control means receives said inactive third detection signal and said inactive first detection signal or when said control means receives said inactive second detection signal.

8. A charge/discharge circuit claimed in claim 7 wherein said control means includes an OR gate having a first input connected to an output of said first comparator and a second input connected to an output of said third comparator, and an AND gate having a first input connected to an output of said second comparator and a second input connected to an output of said OR gate, an output of said AND gate being connected to said gate of said MOS transistor.

9. A charge/discharge circuit claimed in claim 8 wherein said control means further includes a second AND gate having a first input connected to the output of said second comparator and a second input connected to receive an external control signal, an output of said second AND gate being connected to said first input of said first named AND gate.

10. A charge/discharge circuit for preventing overcharging and overdischarging of a secondary cell, the circuit comprising:

a charge/discharge path consisting of only a MOS transistor connected between a first terminal connected to the secondary cell and a second terminal connected to an external DC voltage supply and a load;

a first comparator connected to said first terminal for detecting whether or not said secondary cell is in an overdischarged condition;

a second comparator connected to said first terminal for detecting whether or not said secondary cell is in an overcharged condition;

a third comparator connected to said second terminal for detecting whether or not a voltage is supplied from said external DC voltage supply; and a control logic circuit connected to said first, second and third comparators so as to bring said MOS transistor into an OFF condition when no voltage is supplied from said external DC voltage supply and said secondary cell is in the overdischarged condition, or when said secondary cell is in the overcharged condition.

* * * * *